US011959323B2

(12) United States Patent
Goetz

(10) Patent No.: US 11,959,323 B2
(45) Date of Patent: Apr. 16, 2024

(54) ARRANGEMENT FOR GUIDING A MOVABLE FURNITURE PART

(71) Applicant: Julius Blum GmbH, Hoechst (AT)

(72) Inventor: Christof Goetz, Lustenau (AT)

(73) Assignee: Julius Blum GmbH, Hoechst (AT)

( * ) Notice: Subject to any disclaimer, the term of this patent is extended or adjusted under 35 U.S.C. 154(b) by 260 days.

(21) Appl. No.: 17/318,229

(22) Filed: May 12, 2021

(65) Prior Publication Data

US 2021/0262268 A1 Aug. 26, 2021

Related U.S. Application Data

(63) Continuation of application No. PCT/AT2019/060363, filed on Nov. 5, 2019.

(30) Foreign Application Priority Data

Nov. 13, 2018 (AT) .............................. A 50974/2018

(51) Int. Cl.
*E05D 15/58* (2006.01)
*E05D 15/26* (2006.01)
*E06B 3/50* (2006.01)

(52) U.S. Cl.
CPC ........... *E05D 15/58* (2013.01); *E05D 15/264* (2013.01); *E06B 3/5045* (2013.01); *E05Y 2900/212* (2013.01)

(58) Field of Classification Search
CPC ... E05D 15/58; E05D 15/264; E05D 15/0604; E05D 15/582; E05Y 2900/212; E06B 3/5045
See application file for complete search history.

(56) References Cited

U.S. PATENT DOCUMENTS

| | | | | |
|---|---|---|---|---|
| 3,687,505 A * | 8/1972 | Fall | F16C 29/04 | 312/331 |
| 3,722,964 A * | 3/1973 | Chitester | A47B 88/493 | 312/331 |
| 4,729,612 A | 3/1988 | Stone | | |
| 4,974,912 A * | 12/1990 | Rask | E06B 3/5045 | 312/331 |
| 4,976,502 A | 12/1990 | Kelley et al. | | |

(Continued)

FOREIGN PATENT DOCUMENTS

| | | |
|---|---|---|
| CN | 106088889 | 11/2016 |
| CN | 108350712 | 7/2018 |

(Continued)

OTHER PUBLICATIONS

International Search Report dated Jan. 23, 2020 in International (PCT) Application No. PCT/AT2019/060363.

*Primary Examiner* — Justin B Rephann
(74) *Attorney, Agent, or Firm* — Wenderoth, Lind & Ponack, L.L.P.

(57) ABSTRACT

An arrangement for guiding a movable furniture part includes a guide rail to be fastened to the fixed furniture part, a guide device mounted movably on the guide rail and in particular can be coupled to the movable furniture part, and a first cable having a first end to be secured to the fixed furniture part and a second end to be coupled to the guide device. A securing device can secure the first cable to the fixed furniture part, and the securing device has a mounting device designed such that the first cable is mounted so as to be movable relative to the fixed furniture part to a limited extent at least in the event of overload.

17 Claims, 9 Drawing Sheets

(56) References Cited

U.S. PATENT DOCUMENTS

Figure 1:
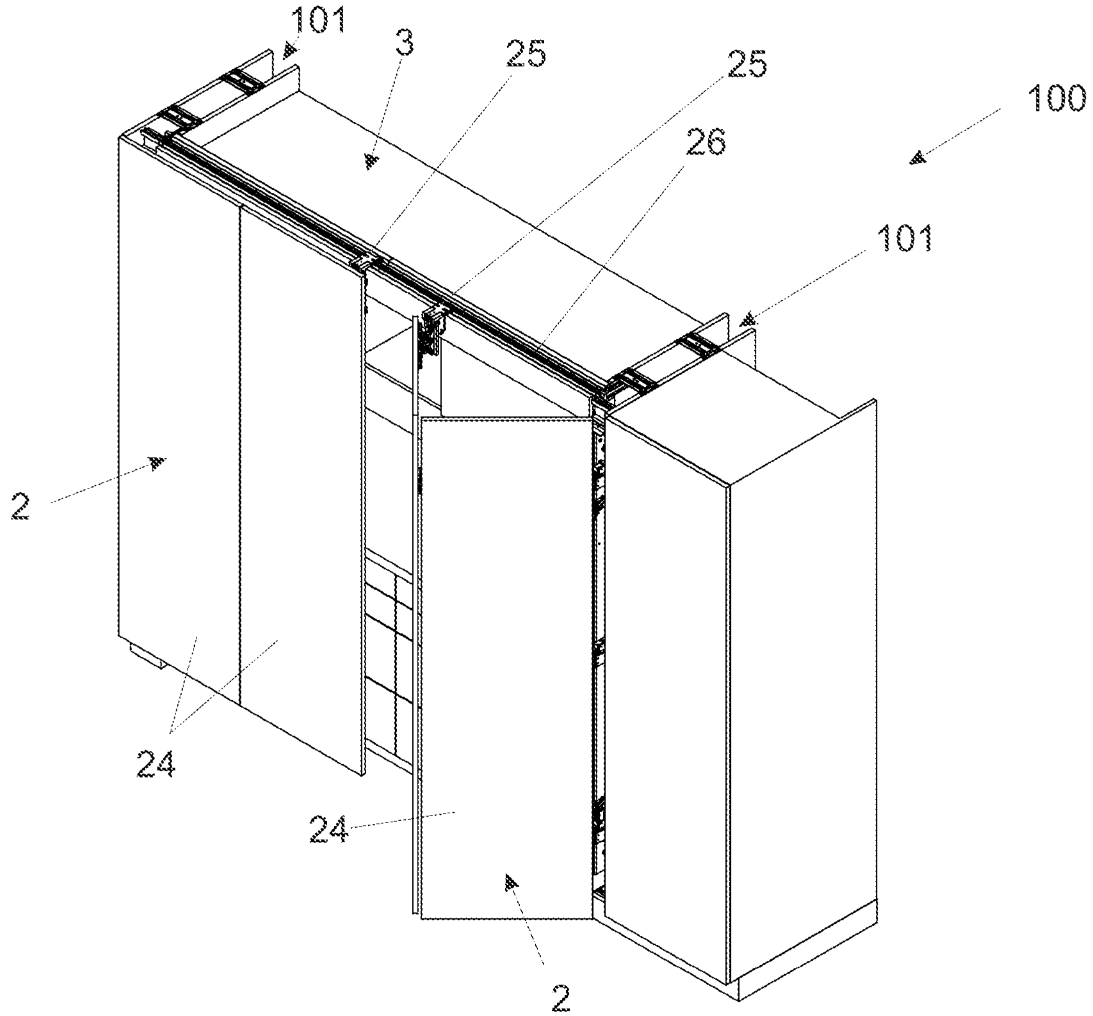

| | | | | | |
|---|---|---|---|---|---|
| 5,078,461 | A | | 1/1992 | Beck et al. | |
| 5,106,173 | A | | 4/1992 | Kelley et al. | |
| 5,395,165 | A | * | 3/1995 | Woerner | E05D 15/58 211/27 |
| 5,626,404 | A | | 5/1997 | Kelley et al. | |
| 6,352,097 | B1 | | 3/2002 | Kem et al. | |
| 6,923,238 | B2 | | 8/2005 | Kern et al. | |
| 6,994,410 | B2 | * | 2/2006 | Hogan | E05D 15/58 312/110 |
| 8,231,187 | B2 | * | 7/2012 | Hoffman | E05D 15/58 16/382 |
| 2002/0062932 | A1 | | 5/2002 | Kern et al. | |
| 2010/0037528 | A1 | * | 2/2010 | Lambright | E05F 1/1058 296/61 |
| 2019/0330898 | A1 | | 10/2019 | Rupp et al. | |

FOREIGN PATENT DOCUMENTS

| | | |
|---|---|---|
| DE | 30 25 288 | 1/1982 |
| DE | 202 16 481 | 1/2003 |
| EP | 1 253 274 | 10/2002 |
| GB | 1 322 645 | 7/1973 |
| JP | 7-293158 | 11/1995 |
| JP | 11-166366 | 6/1999 |
| JP | 2007-63772 | 3/2007 |
| JP | 2010-150841 | 7/2010 |
| JP | 4963137 | 6/2012 |
| JP | 2013-108214 | 6/2013 |
| JP | 2015-52199 | 3/2015 |
| WO | 2017/072106 | 5/2017 |
| WO | 2018/129568 | 7/2018 |

* cited by examiner

ARRANGEMENT FOR GUIDING A MOVABLE FURNITURE PART

BACKGROUND OF THE INVENTION

The invention concerns an arrangement for guiding a moveable furniture part, in particular at least one furniture door, relative to a stationary furniture part. The arrangement includes at least one guide rail which is to be fixed in particular to the stationary furniture part, at least one guide device which is mounted moveably to the at least one guide rail and which can be coupled in particular to the moveable furniture part, and at least one first cable which on the one hand can be fixed to the stationary furniture part and on the other hand can be coupled to the at least one guide device. In addition, at least one fixing device is provided for fixing the at least one first cable to the stationary furniture part.

The invention further concerns an article of furniture comprising at least one moveable furniture part, in particular at least one furniture door, a stationary furniture part and at least one such an arrangement.

Arrangements for guiding a moveable furniture part relative to a stationary furniture part are known from the state of the art.

WO 2018/129568 A1 to the present applicant discloses an arrangement for guiding a moveable furniture part, in particular at least one furniture door, relative to a stationary furniture part, wherein in an embodiment there are provided two such arrangements for guiding a moveable furniture part, which make it possible to displace a moveable furniture part along a guide rail arranged on a stationary furniture part.

If the moveable furniture part in the course of the displacement process comes abruptly to a stop—for example by the moveable furniture part hitting against an obstacle—then the at least one first cables of the two arrangements are heavily loaded at a connecting point of the at least one first cables to the stationary furniture part. This involves an overload situation. Such an overload can result in rupturing of the at least one first cables or release of a connection of the at least one first cables to the stationary furniture part.

SUMMARY OF THE INVENTION

The object of the present invention is to overcome the disadvantages in the state of the art and to provide a fixing device which is improved over the state of the art. A further object is to provide an article of furniture having such an arrangement.

In relation to the arrangement it is therefore provided that the at least one fixing device has a mounting device which is of such a configuration that the at least one first cable is mounted limitedly moveably relative to the stationary furniture part at least in an overload situation.

That ensures that the at least one first cable in an overload situation does not tear or that the connection of the at least one first cable to the stationary furniture part does not become detached. Instead an overload which occurs is compensated by the relative movement of the at least one first cable with respect to the stationary furniture part.

According to a preferred embodiment of the invention, the at least one fixing device includes at least one elastic member for carrying forces acting on the at least one first cable.

The overload can be better compensated in that way. In addition, the at least one elastic member provides for damped deceleration of the moveable furniture part into an end position of the moveable furniture part.

It has further proven to be advantageous if the at least one fixing device includes at least one main body, wherein the at least one elastic member is connected to the at least one main body and the mounting device.

That provides suitable attachment points for the at least one elastic member.

According to a further aspect of the invention, the at least one elastic member is in the form of a spring, preferably a compression spring.

The at least one first cable can be arranged region-wise within the spring (i.e., at least a portion of the first cable is arranged within the coils of the spring). That promotes a space-saving structure for the arrangement.

Preferably, the mounting device includes at least one device for fastening the at least one cable, preferably wherein the at least one fastening device includes an incision.

The mounting device can include at least one slide, preferably to which the at least one first cable can be fixed.

According to a further aspect of the invention the at least one fixing device has at least one preferably groove-shaped guide for guiding the at least one slide.

That makes it easier to perform a limited movement of the at least one first cable at least in an overload situation (i.e., a situation in which the cable is acted upon by a force greater than a force during normal operation of the arrangement) relative to the stationary furniture part.

Preferably, the at least one fixing device includes an interface for connecting the at least one fixing device to the stationary furniture part and/or to the at least one guide rail, preferably at an end of the at least one guide rail.

It has been found to be particularly advantageous if the arrangement includes at least one further guide rail, at least one further guide device mounted moveably thereto, at least one further cable which on the one hand can be fixed to the stationary furniture part and on the other hand can be coupled to the at least one further guide device, and at least one further fixing device for fixing the at least one further cable to the stationary furniture part, wherein the at least one further fixing device has a mounting device which is of such a configuration that the at least one further cable is mounted limitedly moveably relative to the stationary furniture part at least in an overload situation.

That provides for improved mounting of the moveable furniture part on the stationary furniture part.

According to a further aspect of the invention, the first cable and the at least one further cable can be respectively fixed in the region of an end of the respective guide rail to the stationary furniture part. The ends of the respective guide rail are spaced from each other in a longitudinal direction of the guide rails.

In that way, the overload (excessive force) which occurs in an overload situation is divided to the two arrangements and thus individual loading on the respective arrangements is reduced.

According to a further aspect of the invention, the arrangement can include at least one carrier to which the moveable furniture part can be fixed and which is mounted moveably by way of the provided guide devices on the provided guide rails.

The arrangement can also include at least one synchronization device for synchronization of the movements of the provided guide devices. That counteracts wedging of the guide devices due to irregular loading of the moveable furniture part.

Preferably, the article of furniture includes at least one preferably shaft-shaped hollow space for at least region-wise (partially) accommodating the at least one moveable furniture part.

BRIEF DESCRIPTION OF THE INVENTION

Figure 2A:
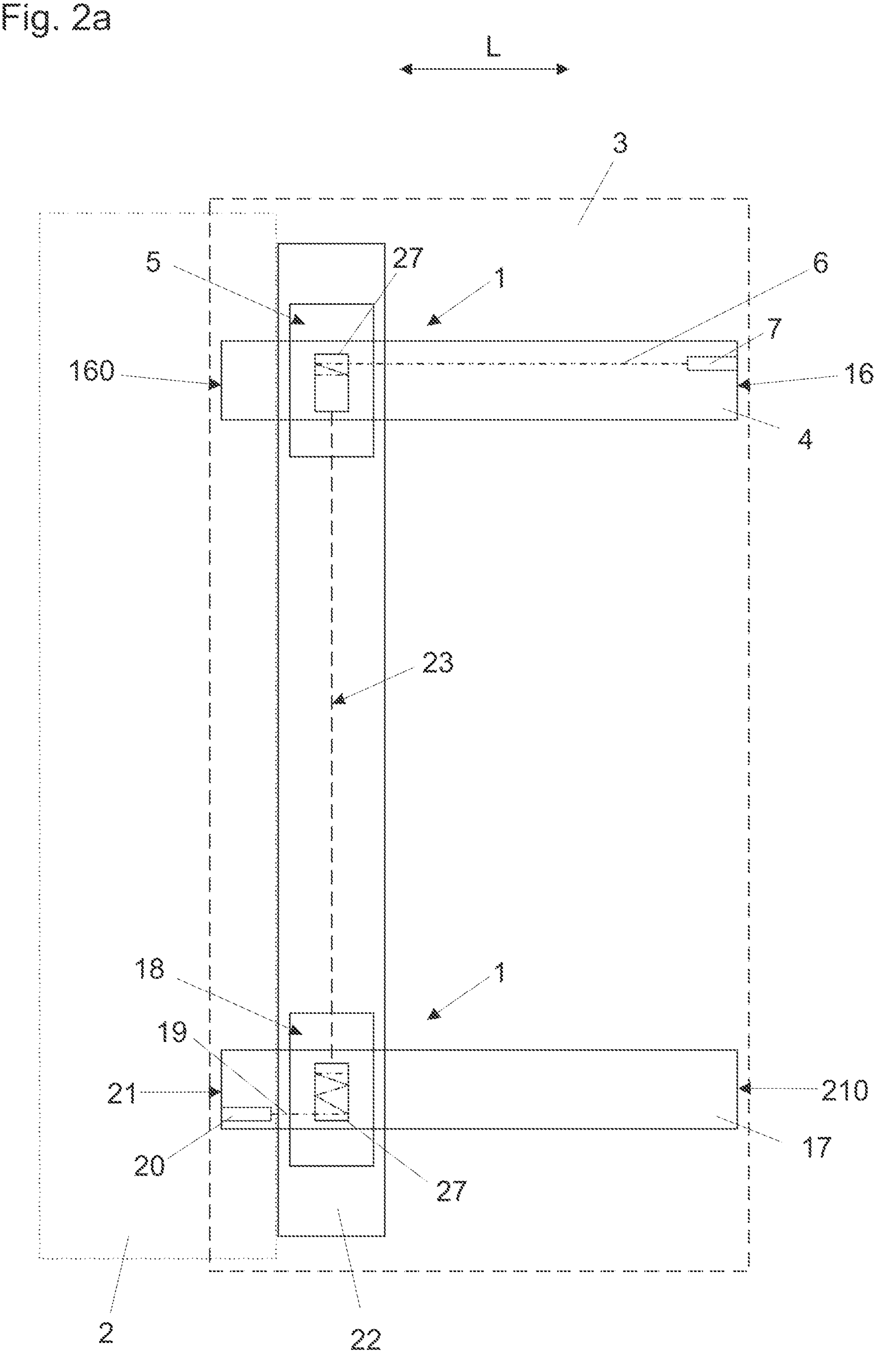
Figure 2B:
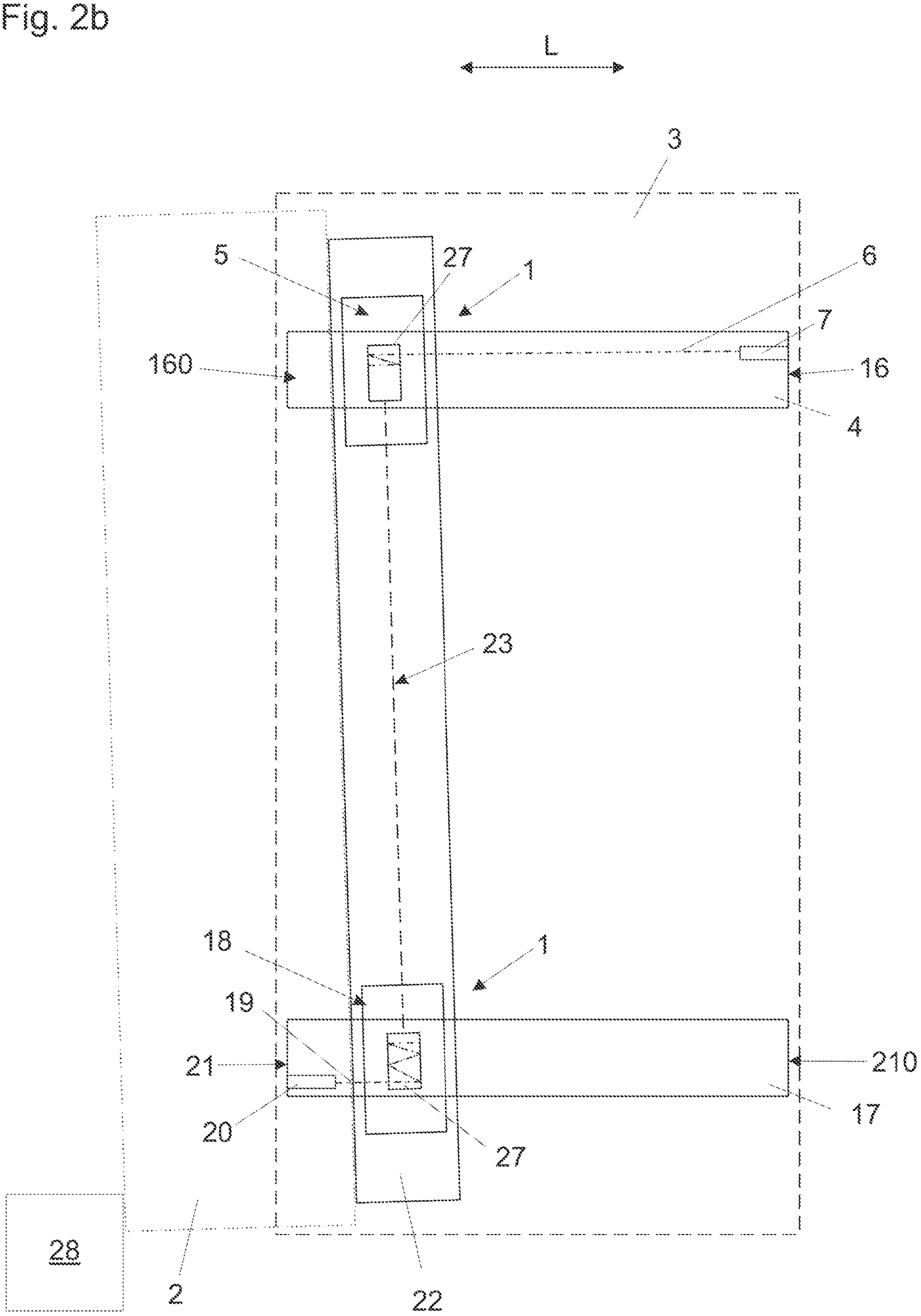
Figure 3:
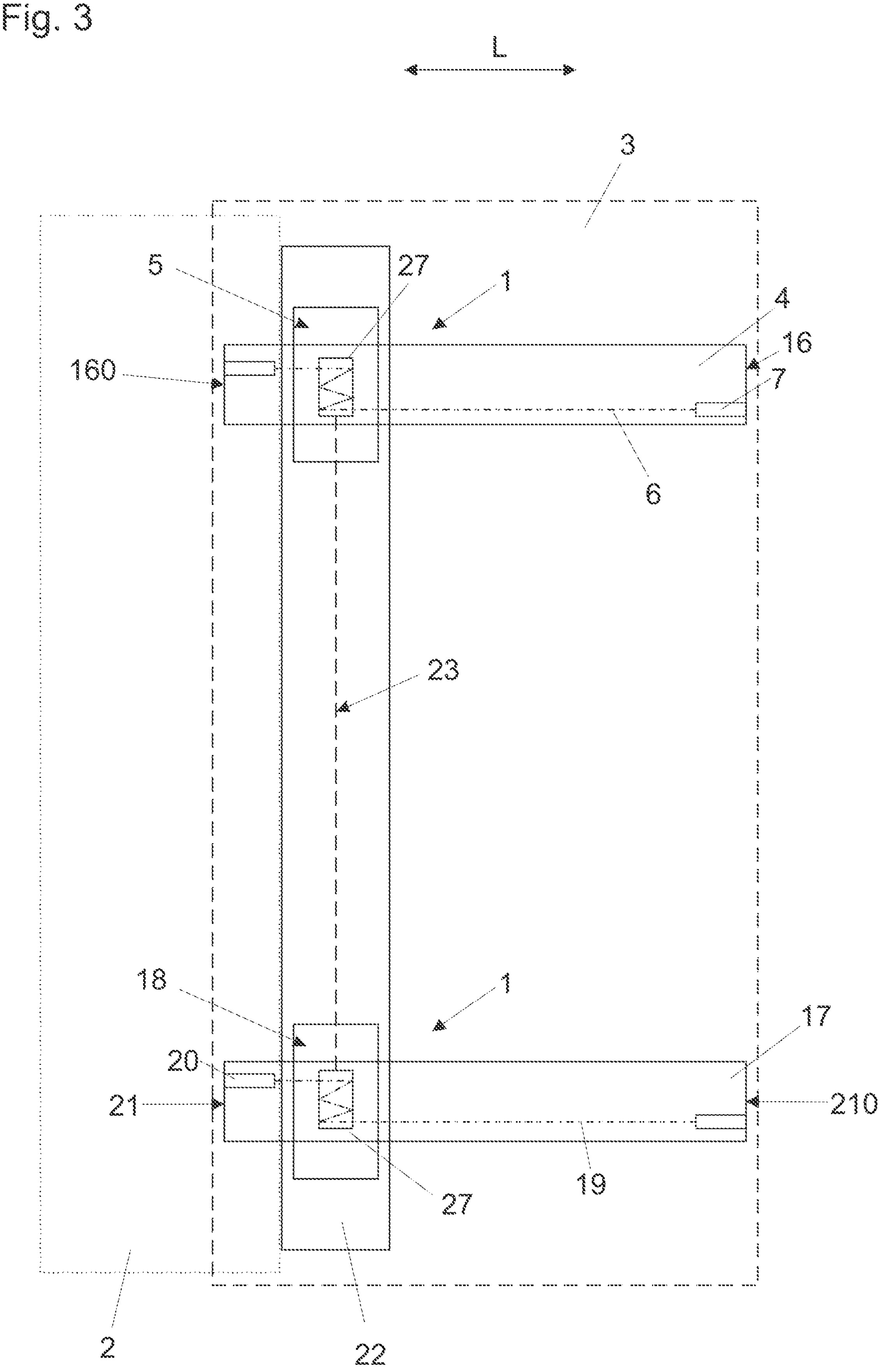
Figure 4:
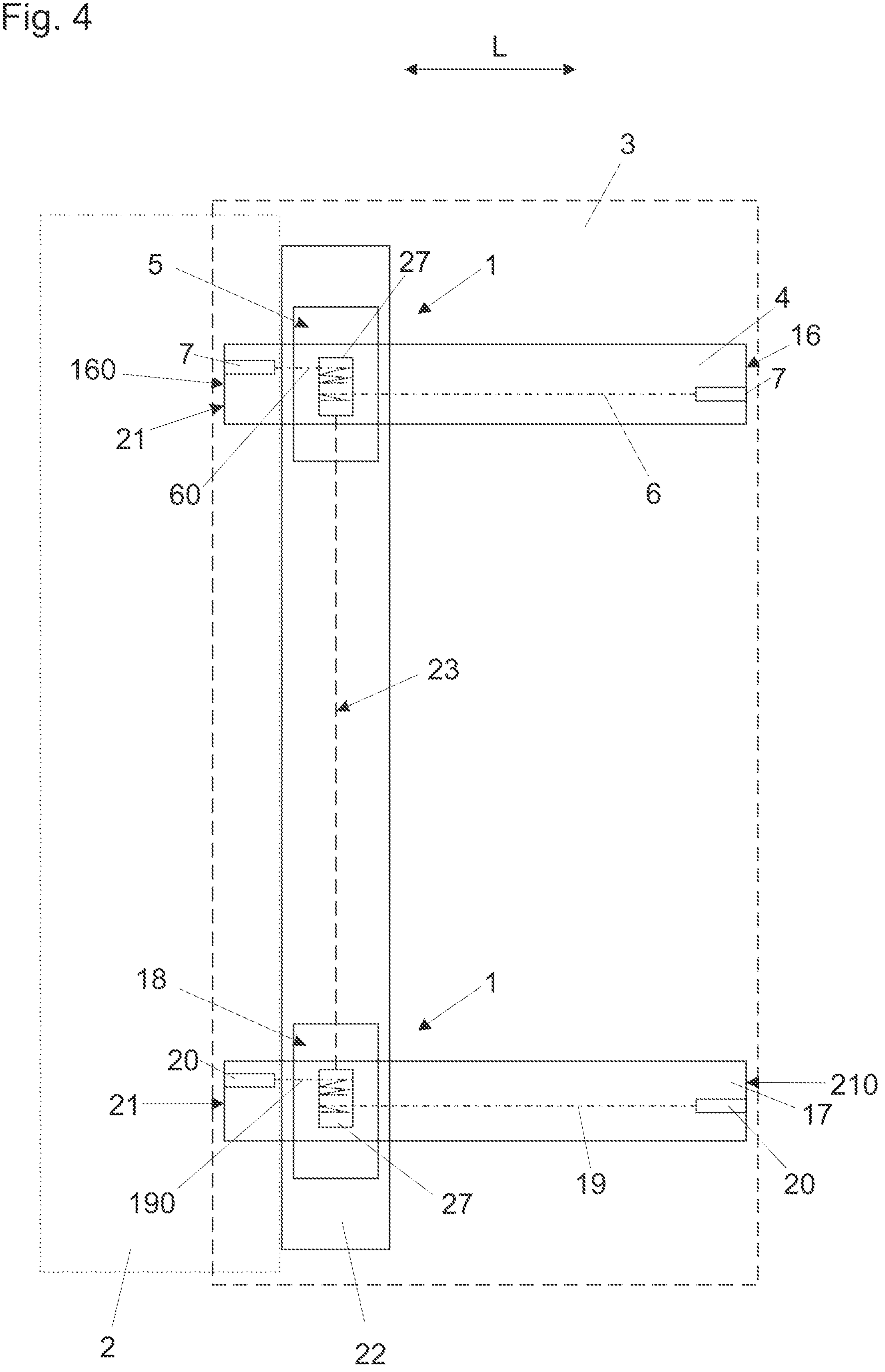
Figure 5:
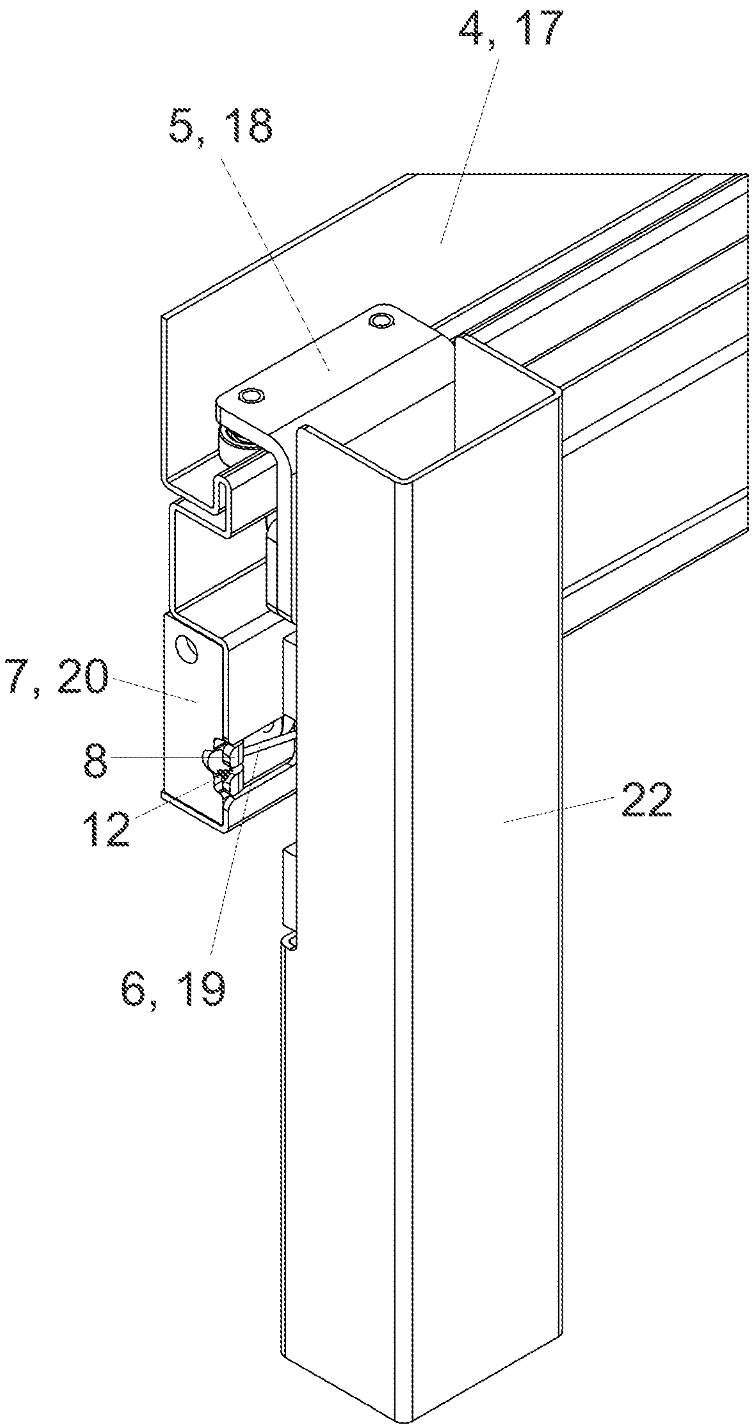
Figure 6:
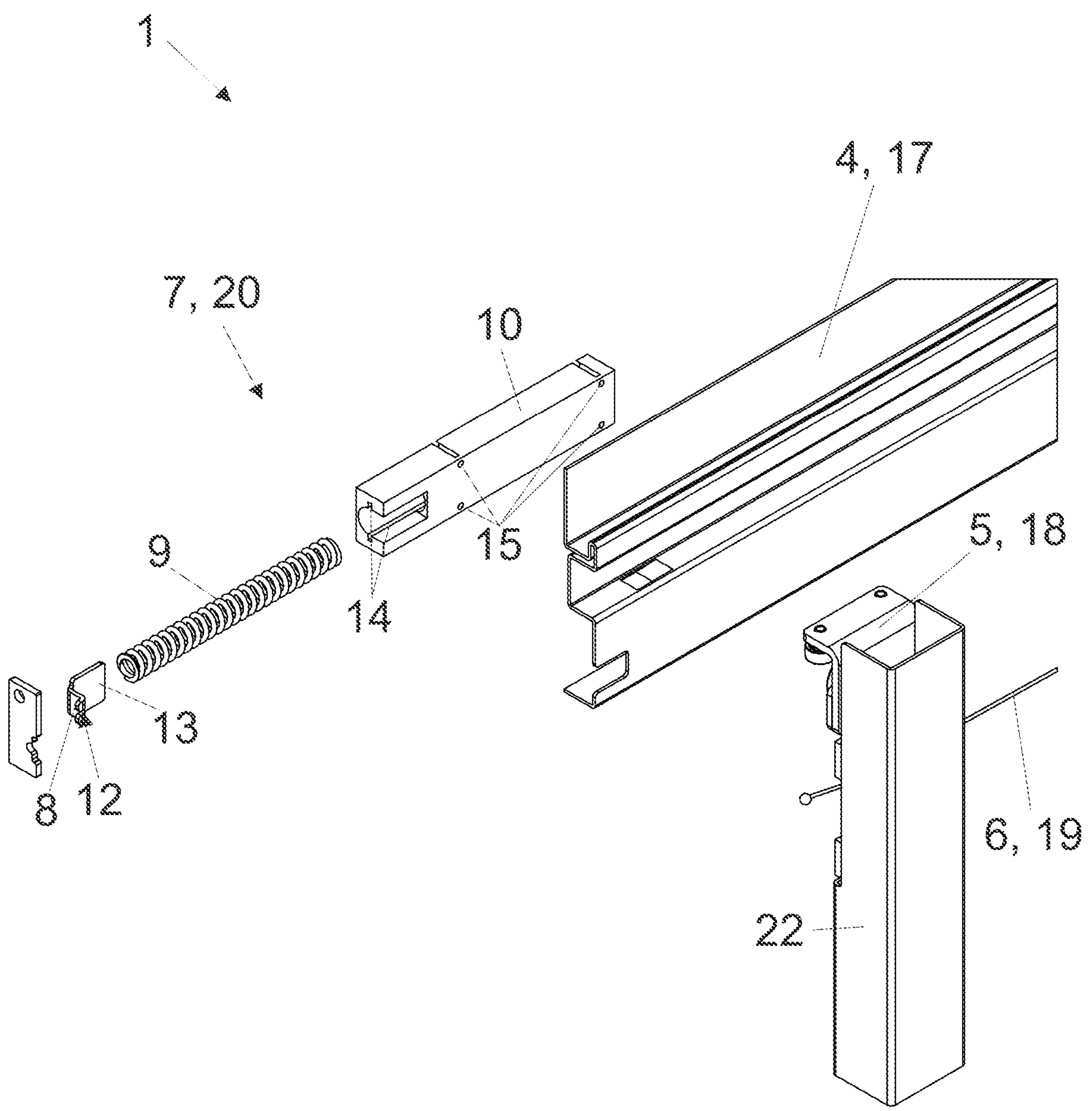
Figure 7:
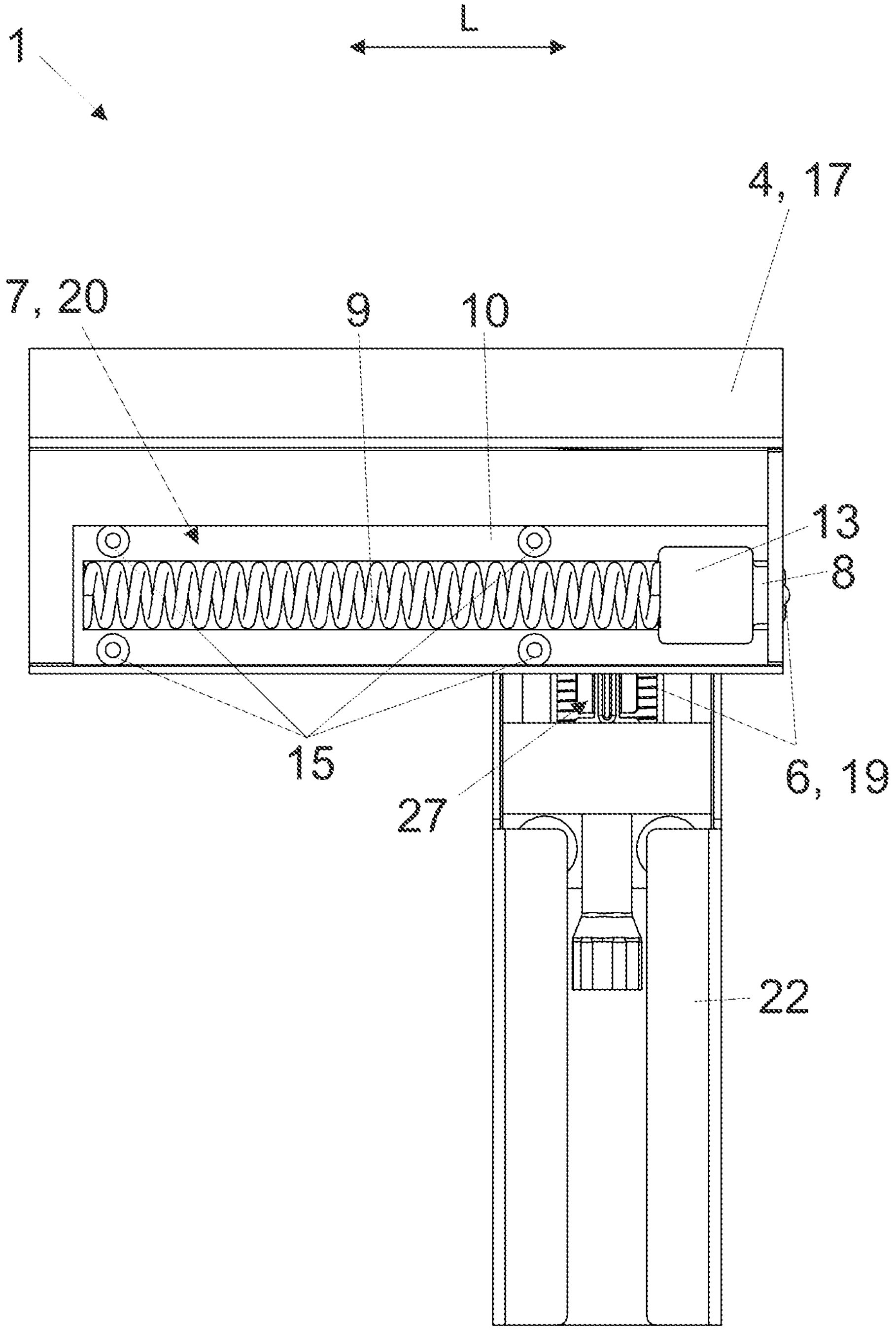
Figure 8:
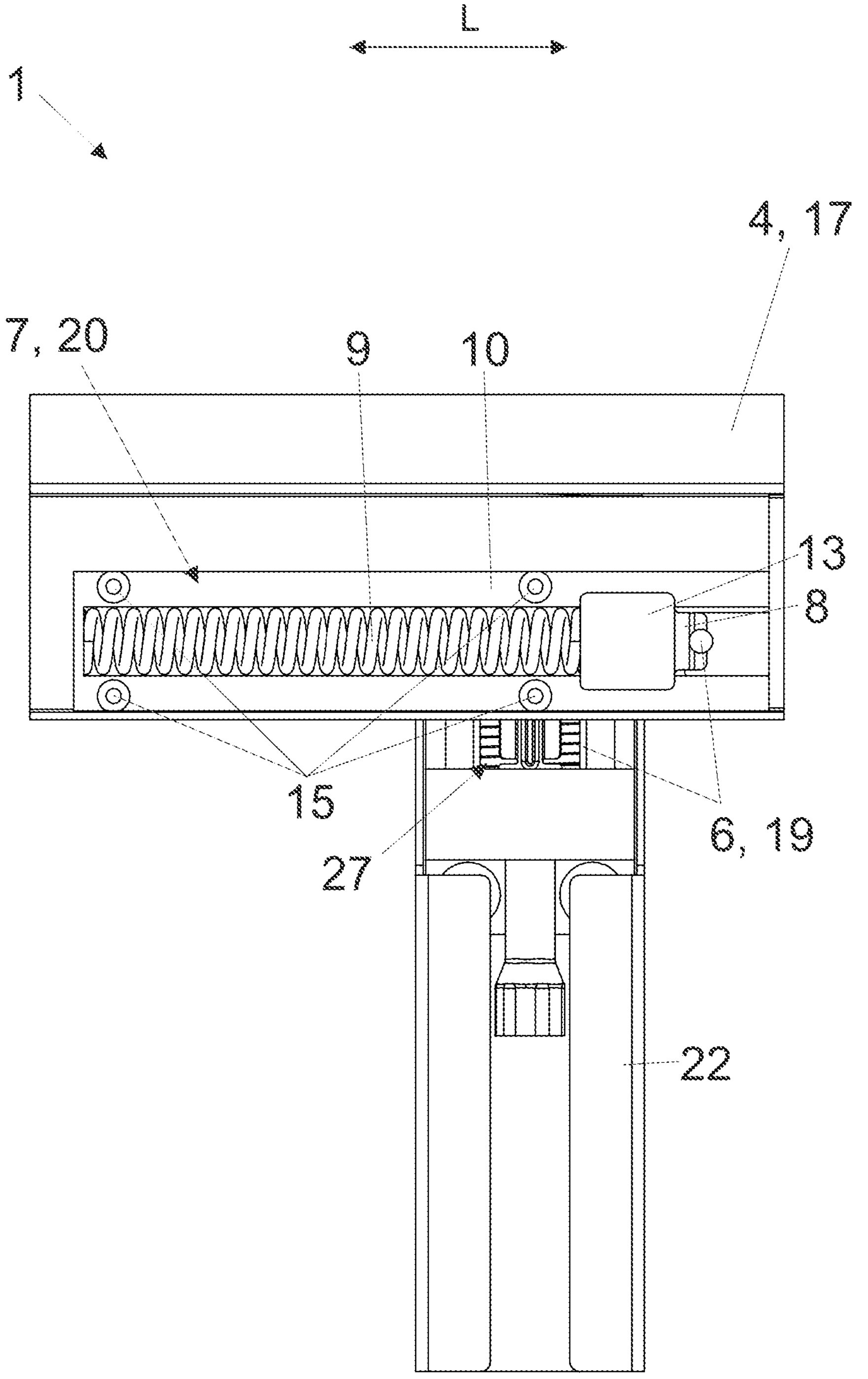

Further details and advantages of the invention will be described more fully hereinafter in the specific description with reference to the drawings in which:

FIG. 1 is a perspective front view of an article of furniture having an arrangement according to the invention, FIG. 2*a* is a diagrammatic view of an arrangement according to the invention with a moveable and a stationary furniture part, FIG. 2*b* is a diagrammatic view of an arrangement according to the invention with a moveable and a stationary furniture part in an overload situation, FIG. 3 is a diagrammatic view of a further embodiment of an arrangement according to the invention with a moveable and a stationary furniture part, FIG. 4 is a diagrammatic view of a further embodiment of an arrangement according to the invention with a moveable and a stationary furniture part, FIG. 5 is a perspective view of an arrangement according to the invention, FIG. 6 is an exploded perspective view of an arrangement according to the invention, FIG. 7 is a side view of an arrangement according to the invention, and FIG. 8 is a side view of an arrangement according to the invention in an overload situation.

DETAILED DESCRIPTION OF THE INVENTION

FIG. 1 shows a perspective front side view of an article of furniture 100. That article of furniture 100 has two moveable furniture parts 2 which each include two furniture fronts 24. It is also possible to see a stationary furniture part 3 in the form of a furniture carcass as well as hollow spaces or cavities 101 arranged at that stationary furniture part 3 for accommodating the moveable furniture parts 2. The moveable furniture parts 2 can be folded together by the carriages 25 and the rail system 26, and are moveable by the arrangements 1 (not visible) according to the invention at least region-wise (partially) into the hollow space 101.

FIG. 2*a* shows an embodiment by way of example of the present invention including two arrangements 1 according to the invention and a moveable furniture part 2 and a stationary furniture part 3 as a diagrammatic side view.

The cables 6, 19 of the arrangements 1 are coupled to the guide devices 5, 18 by coupling devices 27, and are fixed to the stationary furniture part 3 by the fixing devices 7, 20 by way of the guide rails 4, 17.

In this respect, a first fixing device 7 is arranged at an end 16 of the first guide rail 4, and a second fixing device 20 is arranged at an end 21 of the second guide rail 17. No fixing device is arranged at the ends 160, 210 of the guide rails 4, 17.

It is further possible to see a synchronization device (synchronization rod) 23 which synchronizes the movements of the guide devices 5, 18.

It is also possible to see the longitudinal direction L of the guide rails 4, 17.

FIG. 2*b* shows an embodiment of the present invention including two arrangements 1 according to the invention and a moveable furniture part 2 and a stationary furniture part 3 as a diagrammatic side view in an overload situation (i.e., a situation in which the force applied to the cable is greater than the force applied to the cable during normal operation).

It is possible to see an obstacle 28 which the moveable furniture part 2 has encountered. As a result, the moveable furniture part 2 and thus also the carrier 22, the synchronization device 23 as well as the two arrangements 1 according to the invention are no longer in a position normal to the longitudinal direction L of the guide rails 4, 17. The cables 6, 19 are thereby subjected to a tensile stress.

There is an overload (excessive force) at the cables 6, 19, that is compensated for by the fixing devices 7, 20. Without the fixing devices 7, 20, damage could occur to the cables 6, 19.

FIG. 3 shows a diagrammatic side view of a further embodiment of the present invention.

In this case, fixing devices 7, 20 are arranged at all ends 16, 160, 21, of the guide rails 4, 17.

The cables 6, 19 are respectively fixed to the stationary furniture part 3 at both sides by the associated fixing devices 7, 20 and by the guide rails 4, 17.

The cables 6, 19 are further coupled to the guide devices 5, 18 by the coupling devices 27.

FIG. 4 shows a diagrammatic side view of a further embodiment of the present invention.

This embodiment differs from the embodiment of FIG. 3 by the provision of two cables 6, 60 and 19, 190 per guide device. Those cables 6, 60, 19, 190 are in turn fixed at the ends 16, 160, 21, 210 of the guide rails 4, by the associated fixing devices 7, 20 and by the guide rails 4, 17 at the stationary furniture part 3.

In addition, the cables 6, 60, 19, 190 are coupled by the coupling devices 27 to the respective guide devices 5, 18.

FIG. 5 shows a perspective view of an arrangement according to the invention.

It is possible to see a guide device 5, 18 mounted moveably to the guide rail 4, 17, to an end of the fixing device 7, 20, and to the carrier 22.

FIG. 5 further shows the at least one first cable 6, 19 mounted by the incision 12 to the mounting device 8. As shown in FIGS. 5 and 6, the mounting device 8 is mounted inside the guide rail 4, 17, and the guide rail 4, 17 has a recess to allow the cable 6, 19 to pass through the guide rail 4, 17 to the mounting device 8.

FIG. 6 shows an exploded perspective view of an arrangement according to the invention.

In particular, the structure of the fixing device 7, 20 can be clearly seen in this Figure.

In this embodiment, the elastic member 9 which is in the form of a compression spring is arranged in a main body 10 of the fixing device 7, 20. It is also conceivable that the main body 10 is at least partially enclosed by the elastic member 9.

The mounting device 8 and the slide 13 are assembled in one component in this embodiment. However, it is also possible for the mounting device 8 and the slide 13 to have a mutually separate structure.

In this embodiment, the mounting device 8 has a slot-shaped incision for mounting the cable 6, 19. The shape of the incision 12, however, can be of any desired configuration.

It is further possible to see the guide rail 4, 17 as well as the guide device 5, 18 and the carrier 22.

FIG. 7 shows a side view of an embodiment of an arrangement 1 according to the invention. A part of the fixing device 7, 20 has been cut away for better understanding of the invention.

The cable 6, 19 is coupled by the coupling device 27 to the guide device which is concealed by the guide rail 4, 17.

In addition, the cable 6, 19 is connected to the fixing device 7, 20 by the slide 13 and the mounting device 8.

In this embodiment, the cable 6, 19 is not arranged region-wise (partially) within the elastic member 9 which is in the form of a spring. However, the cable 6, 19 can be at least partially arranged within the spring 9 (i.e., within the coils of the spring) to minimize space requirements (i.e., promote a space-saving structure).

The main body 10 of the fixing device 7, 20 is connected to the guide rail 4, 17 by the interfaces 15.

It is further possible to see the carrier 22 connected to the guide device 5, 18 (not visible).

FIG. 8 shows a side view of an embodiment of an arrangement 1 according to the invention in an overload situation (i.e., when force applied to the cables is greater than during normal operation). A part of the fixing device 7, 20 has been cut out for better understanding of the invention.

In the overload situation, the cable 6, 19 is acted upon with a tensile force. That tensile force moves the mounting device 8 and thus the slide 13 against a force actuation afforded by the elastic member 9 in the form of the spring, parallel to a longitudinal direction of the guide device 4, 17.

The overload occurring is therefore compensated for by the movement of the mounting device 8 and in addition by the elastic member 9.

This, therefore, ensures that the cable 6, 19 is not damaged in the overload situation, and a connection of the cable 6, 19 to the stationary furniture part 3 is also not detached.

The invention claimed is:

1. An arrangement for guiding a moveable furniture part relative to a stationary furniture part, the arrangement comprising:
- a guide rail to be fixed to the stationary furniture part, the guide rail having a recess;
- a guide device mounted moveably to the guide rail and configured to be coupled to the moveable furniture part;
- a cable to be fixed to the stationary furniture part and to be coupled to the guide device; and
- a fixing device for fixing the cable to the stationary furniture part to transmit a normal operation force between the guide device and the stationary furniture part via the cable, wherein the fixing device includes:
  - a mounting device mounted inside the guide rail, and the mounting device being arranged such that the cable passes through the recess of the guide rail, and the mounting device being configured such that the cable has a limited amount of movement relative to the stationary furniture part during an overload situation in which excessive force is applied between the guide device and the stationary furniture part via the cable, the excessive force being greater than the normal operation force;
  - an elastic member for carrying forces acting on the cable, the elastic member being in the form of a compression spring, the cable being at least partially arranged within the coils of the compression spring.

2. The arrangement as set forth in claim 1, wherein the fixing device further includes a main body, wherein the elastic member is connected to the main body and the mounting device.

3. The arrangement as set forth in claim 1, wherein the mounting device includes a fastening device for fastening the cable to the mounting device.

4. The arrangement as set forth in claim 3, wherein the fastening device includes an incision.

5. The arrangement as set forth in claim 1, wherein the mounting device includes a slide.

6. The arrangement as set forth in claim 5, wherein the fixing device has a guide for guiding the slide.

7. The arrangement as set forth in claim 6, wherein the guide is shaped as a groove.

8. The arrangement as set forth in claim 5, wherein the cable is fixed to the slide.

9. The arrangement as set forth in claim 1, wherein the fixing device includes an interface for connecting the fixing device to the stationary furniture part.

10. The arrangement as set forth in claim 9, wherein the interface is further configured to connect the fixing device to the guide rail at an end of the guide rail.

11. The arrangement as set forth in claim 1, wherein the guide rail is a first guide rail, the guide device is a first guide device, the cable is a first cable, and the fixing device is a first fixing device, the arrangement further comprising:
- a second guide rail;
- a second guide device mounted moveably to the second guide rail;
- a second cable to be fixed to the stationary furniture part and to be coupled to the second guide device; and
- a second fixing device for fixing the second cable to the stationary furniture part, wherein the second fixing device has a mounting device configured such that the second cable has a limited amount of movement relative to the stationary furniture part during the overload situation.

12. The arrangement as set forth in claim 11, wherein the first cable and the second cable are configured to be fixed in a region of an end of a respective one of the first guide rail and the second guide rail to the stationary furniture part, wherein the respective ends of the first and second guide rails are spaced from each other in a longitudinal direction of the first and second guide rails.

13. The arrangement as set forth in claim 11, further comprising a carrier to be mounted to the moveable furniture part, and mounted moveably by the first and second guide devices on the first and second guide rails.

14. The arrangement as set forth in claim 11, further comprising a synchronization rod for synchronization of movements of the first and second guide devices.

15. An article of furniture comprising:
- a moveable furniture part,
- a stationary furniture part, and
- the arrangement as set forth in claim 1 for guiding the moveable furniture part relative to the stationary furniture part.

16. The article of furniture as set forth in claim 15, wherein the stationary furniture part has a hollow space for at least partially accommodating the moveable furniture part.

17. The article of furniture as set forth in claim 15, wherein the moveable furniture part is a furniture door.

* * * * *